United States Patent [19]

Sterzel

[11] Patent Number: 5,348,983
[45] Date of Patent: Sep. 20, 1994

[54] FOAMED POLYLACTIDE MOLDINGS AND PRODUCTION THEREOF

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 155,146

[22] Filed: Nov. 22, 1993

[30] Foreign Application Priority Data

Nov. 26, 1992 [DE] Fed. Rep. of Germany ....... 4239781

[51] Int. Cl.$^5$ ........................ C08J 9/232; C08J 9/236
[52] U.S. Cl. ........................................ 521/54; 521/60; 521/182
[58] Field of Search ............................ 521/60, 54, 182

[56] References Cited

U.S. PATENT DOCUMENTS

| 4,702,917 | 10/1987 | Schindler | 521/182 |
| 4,719,246 | 1/1988 | Murdock et al. | 521/182 |
| 4,766,182 | 8/1988 | Murdock et al. | 521/182 |
| 5,134,171 | 7/1992 | Hammel et al. | 521/182 |
| 5,238,968 | 8/1993 | Morita et al. | 521/182 |

FOREIGN PATENT DOCUMENTS 507554 10/1992 European Pat. Off. .

OTHER PUBLICATIONS

OZ 43517—BASF Application (in German) Investigation of the structure of suolution grown crystals of lactide copolymers by means of chemical reactions, Fischer et al. Z.U.Z. Polymere, Band 251, 890–990 (1973).

*Primary Examiner*—Morton Foelak
*Attorney, Agent, or Firm*—Keil & Weinkauf

[57] ABSTRACT

The invention relates to foamed polylactide articles obtainable by foaming a mixture of amorphous polylactide granules which contain a blowing agent and of a finely divided polylactide which does not contain a blowing agent, and to a process for producing same.

3 Claims, No Drawings

FOAMED POLYLACTIDE MOLDINGS AND PRODUCTION THEREOF

The present invention relates to foamed polylactide moldings and processes for producing them. Poly-L-lactide, poly-D-lactide and copolymers of L- and D-lactide are known as biodegradable polymers, the rotting of which does not give rise to externatural degradation products but only to biomass and carbon dioxide. Hence polylactides have great application potential, in particular in the packaging sector.

Polylactides can moreover be entirely produced from renewable raw materials: L-lactide, D-lactide, DL-lactide or mixtures thereof can be obtained from lactic acid and polymerized with ring opening and preservation of the asymmetrical carbon atom to form macromolecular products.

The homopolymeric D- and L-lactides have melting points of around 175° C., their tensile modulus of elasticity is from 3500 to 4000 N/mm$^2$ at room temperature and their tensile strength is from 60 to 70 N/mm$^2$, while the weight average molecular weight is from 50,000 to 200,000 g/mol. The glass transition temperature is 50° C.

It is known to admix polylactide melts in an extruder with fluorinated blowing agents such as difluoromethane, 1,1-di-fluoroethane or 1,1,1,3,3-pentafluorobutane and, after it has passed through dies, to decompress the melt and allow it to expand to form a foam (Chemical Abstracts 116 (26): 257043 w). The polylactide foam obtained is amorphous on account of the rapid cooling due to the expansion of the blowing agent.

EP-A 507 554 discloses a degradable foam consisting essentially of polylactone acid or a copolymer of lactic acid and a further hydroxycarboxylic acid.

According to German Patent Application P 42 30 097 (O.Z. 0050/43517), biodegradable foams of high strength and heat resistance are produced from polylactide by admixing polylactide which contains a nucleating agent such as talc with a blowing agent and expanding, or foaming, at from 80° to 140° C., preferably at about 100° C.

This is done for example by admixing a polylactide melt with blowing agents such as n-butane, n-pentane, cyclopentane, acetone, methyl formate or mixtures thereof under the correspondingly high vapor pressure. The melt with the blowing agent is then quenched under counter-pressure to below the softening temperature to form an amorphous granular product which on heating to 80° 140° C. expands through vaporization of the blowing agent and becomes partly crystalline, as intended.

It is this tendency to become partly crystalline to a high extent (in general up to 80%) which confers particularly high stiffness and strength properties on the homopolymeric form of poiy-L-lactide in particular (as also on the homopolymeric form of poly-D-lactide), while the high melting point of about 175° C. is responsible for the very high heat resistance.

If, however, foamed moldings are to be produced by foaming granules containing a blowing agent in a heated mold, the high orientation and high crystallinity may give rise to problems in that the necessary welding-together of the particles toward the end of the foaming process is not sufficiently ensured in locations where the draw ratio is high.

It is true that this problem can be circumvented by replacing the L- or D-lactide homopolymer by copolylactides containing an increased amount of whichever is the other enantiomer. This does enhance the weldability and reduces the end temperature required for foaming. For instance, introducing for example 10.3% by weight of D-units into poly-L-lactide lowers the melting point, measured by DSC using a heating rate of 16° C./min, from 170° C. to 139° C. and the crystallinity from about 87% to 63% (Kolloid-Z.u.Z. Polymere 251 (1973) 980–990). However, the mechanical properties of the moldings moldings obtained are adversely affected.

It is an object of the present invention to provide foamed polylactide moldings combining improved welded-together of the foam particles with a high proportion cf L-lactide or D-lactide in the polylactide.

We have found that this object is achieved when foamed polylactide moldings are produced by mixing polylactide granules which contain a blowing agent with a ground polylactide which does not contain a blowing agent and using this mixture for producing the moldings.

The present invention accordingly provides foamed polylactide moldings obtainable by foaming a mixture of amorphous polylactide granules which contain a blowing agent and of a finely divided polylactide which does not contain a blowing agent.

The present invention also provides a process for producing foamed polylactide moldings by foaming a mixture of amorphous polylactide granules which contain a blowing agent and of a finely divided polylactide which does not contain a blowing agent in a mold.

Polylactides for the purposes of the present invention are poly-L-lactide, poly-D-lactide, copolymers between L- and D-lactide and also copolymers of L- and/or D-lactide with small amounts of α-hydroxycarboxylic acids other than lactic acid. A preferred α-hydroxycarboxylic acid is α-hydroxyacetic acid, or its cyclic double ester, glycolide. These α-hydroxycarboxylic acids generally affect the biodegradability and the mechanical properties and are therefore used only in small amounts.

The polylactides of the invention are generally predominantly composed of the D- or the L-enantiomer.

Preferably the polylactide granules which contain a blowing agent and/or the finely divided polylactides which do not contain a blowing agent are made of a polylactide which is at least 90% by weight either L- or D-enantiomer.

In a particularly preferred embodiment of the invention, the polylactide granules which contain a blowing agent and the finely divided polylactides which do not contain a blowing agent are made independently of each other of a polylactide which is at least 90% by weight either L- or D-enantiomer.

The polylactide granules of the invention which contain a blowing agent can be obtained for example by mixing blowing agents such as n-butane, n-pentane, cyclopentane, acetone, methyl formate or mixtures thereof into a polylactide melt.

The melt with the blowing agent is then quenched under counter-pressure to below the softening temperature and granulated to form an amorphous granular product which contains a blowing agent.

Polar blowing agents such as methyl formate or acetone are generally mixed with apolar blowing agents such as n-pentane in order that premature crystallization of the polylactides due to polar blowing agents may ideally be avoided.

Alternatively, fine amorphous polylactide granules about 1 mm in size, which may likewise contain a nucleating agent, are suspended in water and admixed with the blowing agent at pressures of up to 100 bar over a period of up to 10 h and a temperature below 50° C.

It is also possible to impregnate the amorphous polylactide granules at room temperature with a liquid blowing agent or blowing agent mixture, then to decant off the blowing agent or blowing agent mixture, and subsequently to foam the granules at elevated temperatures.

To achieve uniform foaming, the polylactide granules which are to be impregnated with a blowing agent are generally provided with from 0.2 to 0.5% by weight, based on the granules before impregnation, of a finely divided heterogeneous nucleating agent, preferably talc. The nucleating agent is usually mixed into the melt using an extruder, the mixture is extruded through dies and the extrudate is then quenched in a water bath to keep the material in the amorphous state. Drying is advantageously at below 50° C. to prevent crystallization.

This is followed by impregnation with the blowing agent. The blowing agent used is preferably a mixture of polar and apolar solvents of low vapor pressure, which are selected in such a way that only a tolerably small degree of crystallization, if any, takes place during the impregnation at below the glass softening temperature. Preference is given to using mixtures of methyl formate and pentane.

The granules to be impregnated, for example from 0.5 to 5 mm in size, are generally stored in the blowing agent at below 30° C. for a period from 1 to 20 h and then separated from the blowing agent by screening or decanting. The mixture with the fine polylactide which has not been impregnated and hence does not contain a blowing agent can be carried out in simple tumbling mixers.

The proportion of ground polylactide which has not been impregnated with a blowing agent is generally from 0.01 to 50% by weight of the total mixture, preferably from 0.1 to 20% by weight, particularly preferably from 0.2 to 10% by weight. The particle size is generally from 0.001 to 0.5 mm, preferably from 0.01 to 0.1 mm, and the unimpregnated polylactide can be prepared for example by low temperature grinding of granules or by precipitating a polylactide solution in a nonsolvent.

The time required in the process of the invention for crystallizing the unimpregnated polylactide is generally from 2 to 10 min at from 100° to 165° C., and depends on the particular production conditions. The polylactide which does not contain a blowing agent preferably contains no nucleating agent either.

The moldings can be produced for example in molds having fine holes from 0.5 to 1 mm through which steam at up to 165° C. can enter directly, or in autoclaves whose interior is exposed to steam at temperatures of up to 165° C. It is also possible to use other embodiments known per se, such as molds which are heated indirectly with liquid heat transfer media, or electrically. Owing to the polar character of the polylactides, microwave heating is also possible.

If steam is used for heating, the contact time is advantageously limited to a few minutes in order that significant hydrolysis of the polylactide may be avoided.

If the mixture of the invention is used for producing foamed moldings, the ground unimpregnated polylactide will admittedly soften during the foaming, but it is not stretched and hence it will initially remain in the amorphous state. At the same time its viscosity decreases by a corresponding amount, and owing to its solubility in the oriented, foamed polylactide which is undergoing crystallization, it will adhere the expanding particles together toward the end of the foaming process, under the expansion pressure. The molding is then maintained at the final temperature for a further period, in the course of which the nonnucleated, adhering material likewise crystallizes and the heat resistance of the foamed molding is consequently not significantly adversely affected, if at all.

EXAMPLE 5 kg of poly-L-lactide having an inherent viscosity of 1.68, measured in 0.1% strength solution in chloroform as solvent at 25° C., were powdered with 20 g of finely divided talc and melted and homogenized in an extruder at 205° C. The melt was extruded through dies 2 mm in diameter and the strands obtained passed through a water bath. The strands were hauled off at a speed such that they attained a diameter from 0.7 to 1 mm and were mechanically chopped into granules about 1 mm in length. The amorphous granular product thus obtained was dried under an air stream at 40° C.

Then some of the granules were stirred at 20° C. for 6 h in a blowing agent mixture of 3 parts by volume of methyl formate and 4 parts by volume of n-pentane. The blowing agent was then decanted off and the granules were briefly air-dried.

10 g of poly-L-lactide granules not provided with talc or blowing agent were dissolved in 100 ml of chloroform at 40° C. This solution was then slowly introduced into 1 liter of vigorously stirred methanol, and the polylactide came down as a precipitate. The precipitated polylactide was filtered off, briefly dried at room temperature and then ground under liquid nitrogen cooling until 90% by weight of the particles of the resulting powder were less than 0.03 mm in size.

Finally, 40 g of the granules containing blowing agent were mixed with 1.6 g of the finely divided poly-L-lactide which did not contain a blowing agent, by shaking in a closed vessel. The mixture was introduced into a 1 liter capacity mold whose walls had been drilled with holes each 1 mm in diameter. The mold was sealed and thrown into a vessel containing boiling water. After 5 min the mold was removed from the water, quenched in cold water, and opened. The molding recovered had integrity and bending strength.

COMPARATIVE EXAMPLE

The example according to the invention was repeated with no poly-L-lactide being mixed into the granules to be foamed. What was found on opening the mold was a molded object which was easy to separate into the individual foamed granules.

We claim:

1. A process for producing foamed polylactide articles by which is at least 90% by weight either L- or D-enantiomer heating and foaming a mixture of amorphous polylactide which polylactide is at least 90% by weight either L- or D-enantiomer granules which contain a blowing agent and of a finely divided polylactide which does not contain a blowing agent in a mold.

2. A process as claimed in claim 1, wherein the finely divided polylactide which does not contain a blowing agent comprises from 0.01 to 50% by weight of the mixture.

3. A process as claimed in claim 2, wherein the particle size of the polylactide which doesnot contain a blowing agent is from 0.001 to 0.5 mm.

* * * * *

UNITED STATES PATENT AND TRADEMARK OFFICE
CERTIFICATE OF CORRECTION

PATENT NO. : 5,348,983
DATED : September 20, 1994
INVENTOR(S) : Hans-Josef Sterzel It is certified that error appears in the above-indentified patent and that said Letters Patent is hereby corrected as shown below:

Column 4, claim 1, lines 55 and 57, delete "which is at least 90% by weight either L- or D-enantiomer".

Column 4, claim 1, lines 57 and 58 delete "which polyactide is at least 90% by weight either L- or D-enantiomer".

Column 4, claim 1, line 58, after "granules" insert --which is at least 90% by weight either L- or D-enantiomer--.

Column 4, claim 1, line 59, after "polyactide" insert --which polyactide is at least 90% by weight either L- or D-enantiomer--.

Signed and Sealed this

Eighth Day of November, 1994

Attest:

BRUCE LEHMAN

*Attesting Officer*     *Commissioner of Patents and Trademarks*